United States Patent

Pasinato

(10) Patent No.: US 9,543,755 B2
(45) Date of Patent: Jan. 10, 2017

(54) AUTOMOTIVE ELECTRICALLY-ACTUATED DEVICE END-OF-TRAVEL DETECTION

(71) Applicant: FCA ITALY S.p.A., Turin (IT)

(72) Inventor: Daniele Pasinato, Turin (IT)

(73) Assignee: FCA Italy S.p.A., Turin (IT)

(*) Notice: Subject to any disclaimer, the term of this patent is extended or adjusted under 35 U.S.C. 154(b) by 0 days.

(21) Appl. No.: 14/734,517

(22) Filed: Jun. 9, 2015

(65) Prior Publication Data

US 2015/0364911 A1 Dec. 17, 2015

(30) Foreign Application Priority Data

Jun. 12, 2014 (IT) .......................... TO2014A000473

(51) Int. Cl.
*G05B 5/00* (2006.01)
*H02H 7/085* (2006.01)

(52) U.S. Cl.
CPC .................. *H02H 7/0851* (2013.01)

(58) Field of Classification Search
CPC ......... H02H 7/0851; H02H 7/085; H02H 7/08
See application file for complete search history.

(56) References Cited

U.S. PATENT DOCUMENTS

| | | |
|---|---|---|
| 4,647,825 A | 3/1987 | Profio et al. |
| 5,245,496 A | 9/1993 | Kim et al. |
| 6,278,254 B1 | 8/2001 | Harkey |
| 8,633,666 B2 | 1/2014 | Guarnizo |
| 9,257,918 B2 | 2/2016 | Kakuno |
| 2010/0171457 A1* | 7/2010 | Letor .................. G01P 3/48 318/490 |

FOREIGN PATENT DOCUMENTS

CN     103812292 A    5/2014

OTHER PUBLICATIONS

CN App. 201510325146.8, Office Action dated Jul. 4, 2016 (5 pages).

* cited by examiner

*Primary Examiner* — Karen Masih
(74) *Attorney, Agent, or Firm* — Sutherland Asbill & Brennan LLP

(57) ABSTRACT

An automotive electronic control unit configured to control an automotive electrically-actuated device which is required to move from/to one or more end-of-travel positions, wherein the electronic control unit is configured to detect reaching an end-of-travel or stall position by the automotive electrically-actuated device based on:
  amplitude of the electric current absorbed by the automotive electrically-actuated device,
  gradient of amplitude of the electric current absorbed by the automotive electrically-actuated device, and
  ripple frequency of amplitude of the electric current absorbed by the automotive electrically-actuated device.

20 Claims, 7 Drawing Sheets

AUTOMOTIVE ELECTRICALLY-ACTUATED DEVICE END-OF-TRAVEL DETECTION

TECHNICAL FIELD OF THE INVENTION

The present invention generally concerns automotive electrically-actuated devices required to move from/to one or more end-of-travel positions, and in particular sensorless detection of an automotive electrically-actuated device reaching an end-of-travel or stall position, which detection is solely based on the electric current absorbed by the automotive electrically-actuated device.

The present invention finds advantageous, but not exclusive, application to detection of end-of-travel or stall positions reached by power windows, which positions corresponding to the complete closing and to the complete opening of the windows, to which the following description will refer without thereby losing in generality.

By way of example, the present invention can in fact also find application to detection of complete opening and complete closing positions reached by power mirrors, seats, sunroofs and aerodynamic mobile components.

STATE OF THE ART

New regulations related to specific markets have extended the operation requirements regarding automotive electronic devices. In particular, for some of these, including power windows, operation must now be ensured at temperatures lower than those for which they were normally validated.

This has had an impact on the basic version of power windows, namely those without electronics on board, directly operated by the electronic control unit of electronic on board accessories and commonly known as "Body Control Module" (BCM), with no anti-pinch protection.

Functional tests on power windows have shown that their correct functionality was not guaranteed at low temperatures (−30° C.). In particular, in these environmental conditions, when the user commands the closing of the window, this may freeze before reaching the end position, and in this case the user is then forced to release the operation button and request a new closing. The window closing is therefore jerky, the operation button must be repeatedly operated, and this procedure often activates the thermal protection of the window-raising electric motor, said protection preventing further operations for a certain amount of time. The final result is that the window reaches a full closing in very long times. Similar considerations also apply to the opening operation.

A control software, stored in and executed by the BCM to detect the opening or closing power window reaching the end-of-travel position to cut off the power to the power window electric motor to prevent any misuse and damage, controls the operation of the power windows.

The detection of the end-of-travel position reached by the power window is excessively prone to errors: with low outside temperature, in fact, the power window control software can erroneously decide that it has already reached the end-of-travel position, when it actually has not.

In fact, the fact that a power window reaches the end-of-travel position is determined according to the electric current absorbed by the window during operation. At the operation temperatures contemplated in the aforementioned regulations, the typical timing of the amplitude of the electric current absorbed by the power window is shown in FIG. 1, which is related to a room temperature of 24° C., and wherein three stages can be distinguished:

initial peak of the amplitude of the electric current absorbed by the power window at start-up, commonly called start-up electric current, due to the overcoming of the initial inertia of the mechanical system, central stage of the operation of the power window, and increase in the amplitude of the electric current absorbed by the power window when the end-of-travel position is being reached.

Currently used control softwares monitor the electric current absorbed by the electric motor and stop the movement of the power windows when the absorbed electric current exceeds a current threshold, typically equal to about 70% of the start-up electric current.

When the room temperatures fall below the temperature threshold defined by the aforementioned regulations, the profile of the amplitude of the electric current absorbed by the electric motor significantly varies if compared to the one shown in FIG. 1, and becomes like the one shown in FIG. 2, which refers to a room temperature of −30° C.

In these environmental conditions, the amplitude of the electric current absorbed by the power window in the operating step exceeds the current threshold long before the power windows reaches the end position and, consequently, its movement is stopped before its actual reaching the end position, i.e. before a total opening or closing of the window.

Power windows operated by electric motors equipped with pulse position encoder to count the number of revolutions of the rotor of the electric motor and thus provide an accurate indication of the window position during its movement may be used to overcome this problem. Such kinds of electric motors, however, are more expensive than the traditional ones, lacking this feature, and therefore their use constitutes an additional cost for the automotive manufacturers.

OBJECT AND SUMMARY OF THE INVENTION

Object of the present invention is to provide a simple and economical solution, not based on the use of electric motors equipped with position encoders, which still ensures the operation of power windows in all environmental conditions, as required by the new regulations.

The object of the present invention is thus an automotive electronic control unit as claimed in the attached claims.

DETAILED DESCRIPTION OF PREFERRED EMBODIMENTS OF THE INVENTION

Figure 1:
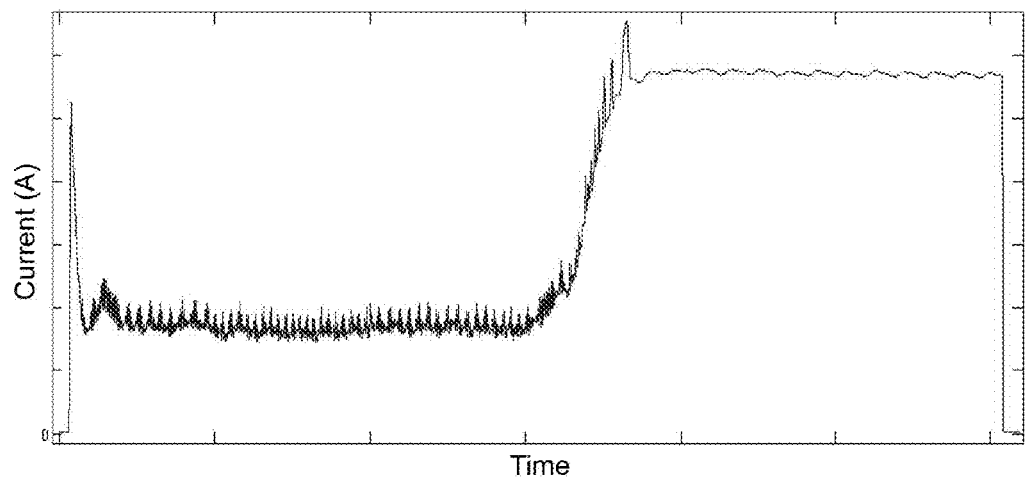
FIG. 1 shows a typical profile of the amplitude of the electric current absorbed by a power window at a room temperature of 24° C.
Figure 2:
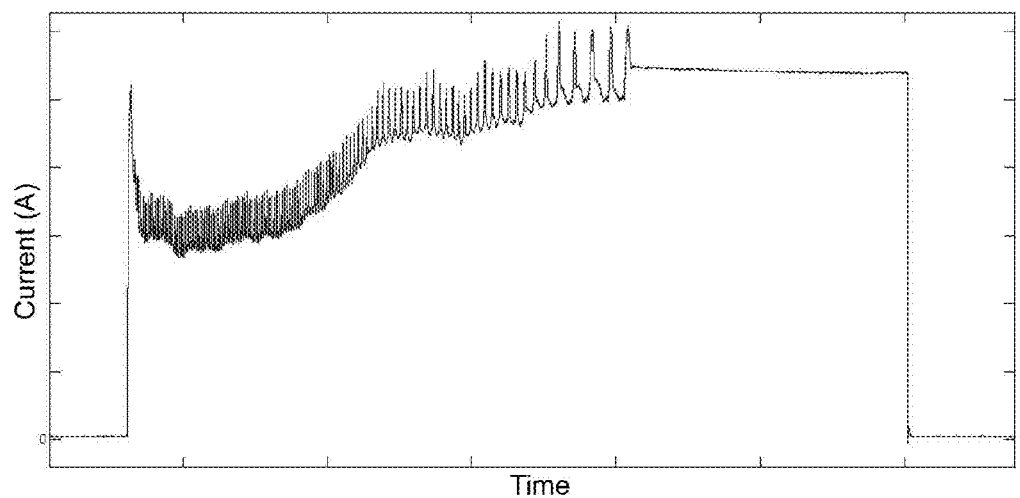
FIG. 2 shows a profile of the amplitude of the electric current absorbed by the power window at a room temperature of −30° C.

The present invention will be now described in detail with reference to the accompanying drawings to enable a person skilled in the art to implement and use it. Various modifications to the described embodiments will be immediately apparent to a person skilled in the art, and the described generic principles might be applied to other embodiments and applications without thereby departing from the scope of protection of the claimed invention. Therefore, the present invention should not be construed to be limited to the described and illustrated embodiments, but provided with the widest scope of protection complying with the principles and features here described and claimed.

Broadly speaking, the present invention essentially provides the detection of an end-of-travel or stall position reached by a power window based on:

amplitude of electric current absorbed by the power window, gradient of amplitude of electric current absorbed by the power window, and ripple frequency of amplitude of electric current absorbed by the power window.

Conveniently, the present invention detects an end-of-travel or stall position reached by the power window with the simultaneous occurrence of all three of the following conditions:

amplitude of electric current absorbed by the power window satisfies a relation with, conveniently is higher than, a threshold current, gradient of amplitude of electric current absorbed by the automotive electrically-actuated device satisfies a relation with, conveniently is not higher than, a threshold positive value, and ripple frequency of amplitude of electric current absorbed by the automotive electrically-actuated device satisfies a relation with, conveniently is lower than, a threshold frequency.

In addition, the current threshold is conveniently a function, in particular is higher than a given percentage, conveniently from 70% to 80%, of the peak amplitude of the electric current absorbed by the start-up power window.

The aforesaid three conditions and their correlation derive from the following observation.

The power window is operated by a DC electric motor, which, during operation, absorbs an electric current whose amplitude includes a sinusoidal component caused by the switching of the brushes.

When, on the other hand, the electric motor stops by reaching the end-of-travel position, the absorbed electric current no longer shows these ripples, having at most external interferences at lower frequencies.

The amplitude increase of the absorbed electric current is an index of an increase of the torque supplied by the electric motor and, consequently, of its rotation speed: in this case, it is clear that the power window is not stationary.

Therefore, by reaching the end-of-travel position, the electric current absorbed by the electric motor has a high and stable amplitude, without the typical ripples provided by the switching of the brushes of the electric motor.

The software for controlling the operation of the power windows implementing the present invention therefore detects the profile of the electric current absorbed by the power window, identifying the sinusoidal component, calculating its frequency, and establishing an increased absorption of electric current by numerically calculating the time derivative.

Figure 3:
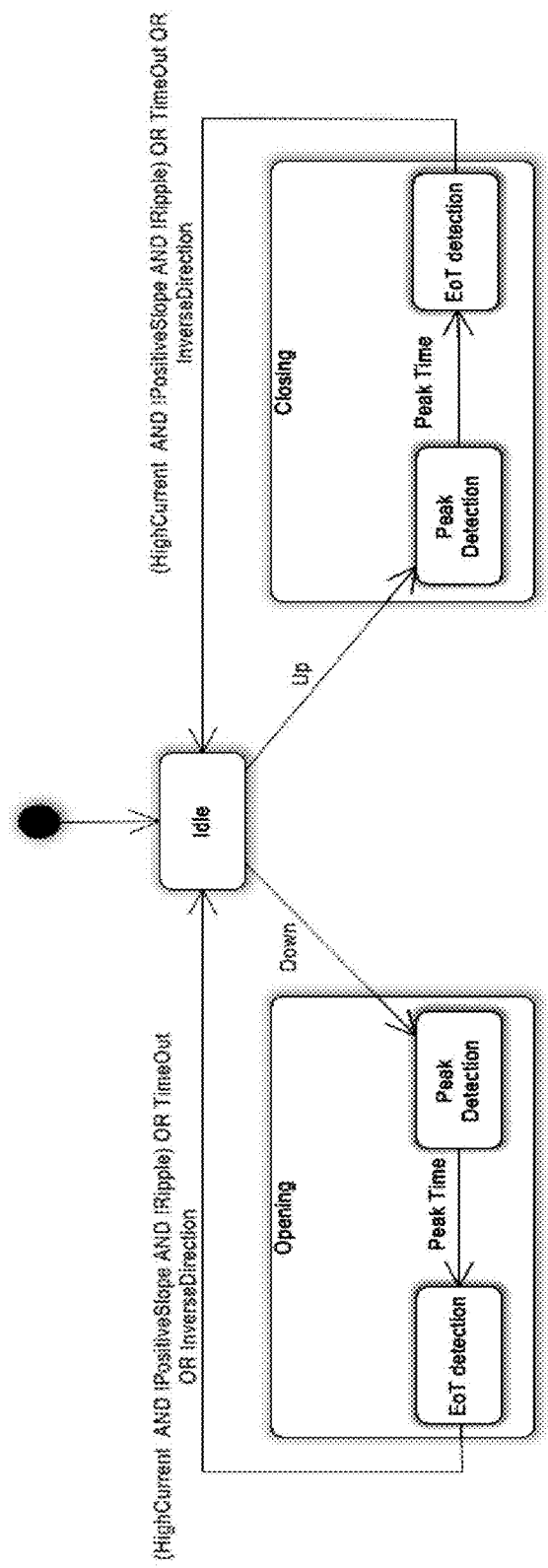
FIG. 3 shows a block diagram of a Finite State Machine that describes the behaviour of a power window.

In greater detail, the behaviour of a power window can be described using a Finite State Machine (Finite State Machine—FSM) shown in FIG. 3, in which:

in the "idle" state, the power window is stationary and the system is waiting for a new command;

in the "closing" state, the power window is raising the glass. This state, which is a macro state, includes the states "Peak Detection" and "End of Travel Detection";

in the "opening" state, the power window is lowering the glass. This state, which is a macro state, includes the states "Peak Detection" and "End of Travel Detection";

in the state "Peak Detection", the peak amplitude of the start-up electric current is estimated;

in the state "End of Travel Detection", the movement of the power window is monitored in order to detect a high absorption of electric current and the absence of a positive gradient of the absorbed electric current and to determine the ripple frequency of the electric current absorbed during the movement.

Figure 4:
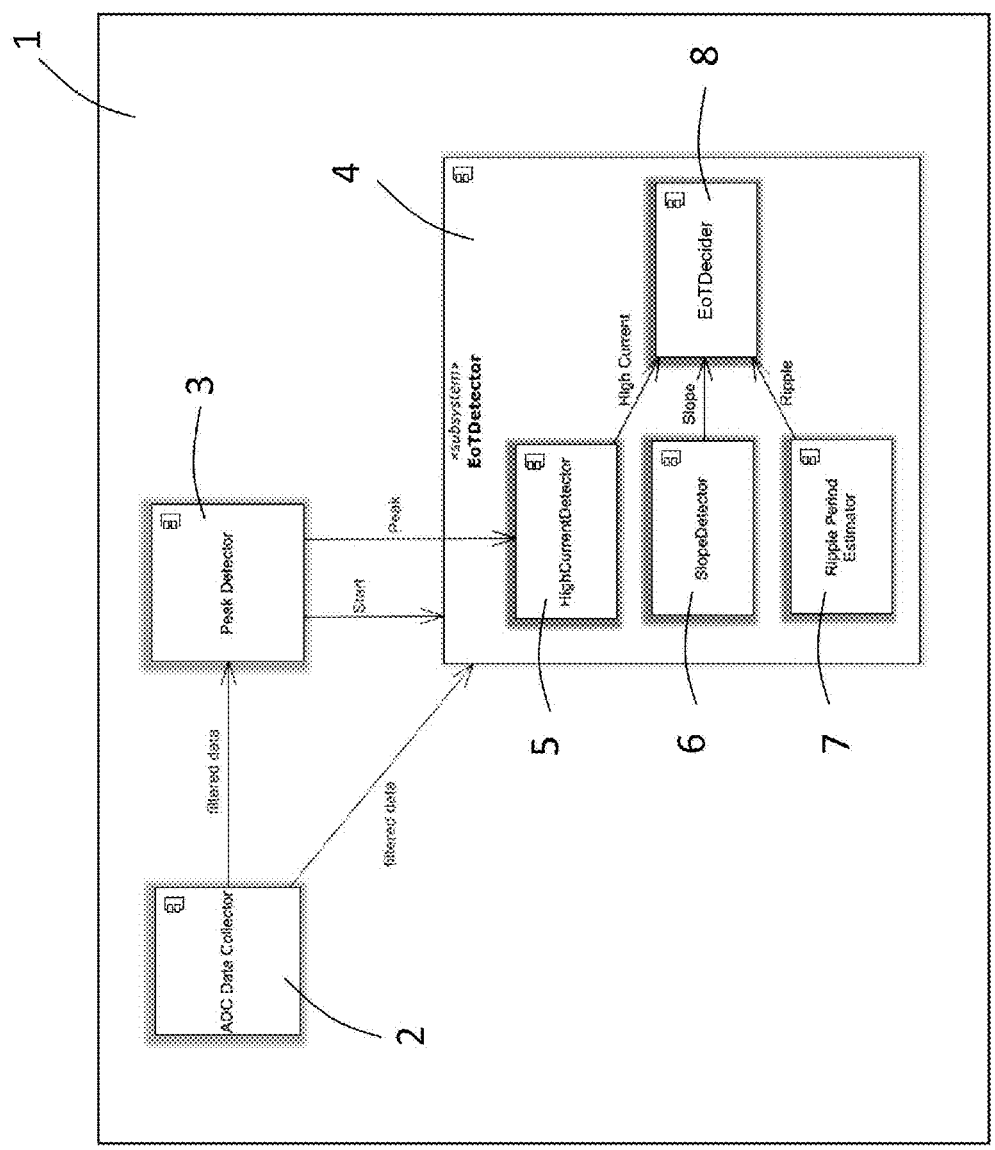
FIG. 4 shows a functional block diagram of a power window control software.

FIG. 4 shows an exemplary non-limitative functional block diagram of a power window control software stored in, and executed by, an automotive electronic control unit, indicated as a whole by 1, in the present case consisting of a so-called Body Control Module (BCM).

The functional block diagrams shown in FIG. 4 and in the following figures, related to the control software, are only indicative of the operations performed by the control software and by its modules, and are in no way limitative of the illustrated structure.

With reference to FIG. 4, the power window control software conveniently comprises the following software modules:

an Analog-to-Digital Converted (ADC) Data Collector 2, hereinafter for brevity "ADC Data Collector", designed to receive an analog electric signal indicative of the electric current absorbed by the power window and generated by the current shunt technique, starting from the driving electric current powered by the power window electronic control unit, to sample the analog electric signal at a predetermined frequency, e.g. 1 MHz, and then suitably filter the sampled analog electric signal to generate corresponding digital data of the electric current absorbed by the power window;

a Peak Detector 3, designed to receive from the ADC data collector 2 the data of the electric current absorbed by the power window and to determine the peak amplitude of the start-up electric current; and an End-of-Travel Detector 4, designed to receive from the ADC data collector ADC 2 the data of the electric current absorbed by the power window and from the peak detector 3 the peak amplitude of the start-up electric current, and to determine, according to the input data, whether the power window has reached an end-of-travel position.

End-of-Travel Detector 4 conveniently comprises:

a High Current Detector 5 designed to compare the data of the electric current absorbed by the power window with a high current threshold, which, conveniently but not necessarily, is a function of a peak amplitude of a start-up electric current, for example is conveniently but not necessarily equal to a certain percentage, conveniently from 70% to 80%, of the peak amplitude of the start-up electric current, and to provide output information, conveniently of Boolean type, indicating whether the amplitude of the electric current absorbed by the power window satisfies a predetermined relation with the high current threshold, conveniently is lower or higher than the high current threshold;

a Slope Detector 6 designed to compute the gradient of the amplitude of the electric current absorbed by the power window and to provide information, conveniently of Boolean type, indicating whether the gradient of the absorbed electric power satisfies a predetermined relation with a control threshold, conveniently of positive value, conveniently is higher or lower than the control threshold;

a Ripple Period Estimator 7 designed to calculate the ripple period (or alternatively the frequency) of the amplitude of the electric power absorbed by the power window, to compare it with a given threshold indicating a blocked motor ripple period threshold and to provide information, conveniently of Boolean type, indicating whether the ripple period of the amplitude of the electric current absorbed by the power window satisfies a predetermined relation with a ripple period threshold, conveniently is lower or higher than the ripple period threshold; and an End-of-Travel (EoT) Decider 8 designed to receive information from the High Current Detector 5, from the Slope Detector 6 and from the Ripple Period Estimator 7 and to decide when to stop the power window on the basis of said information.

Figure 5:
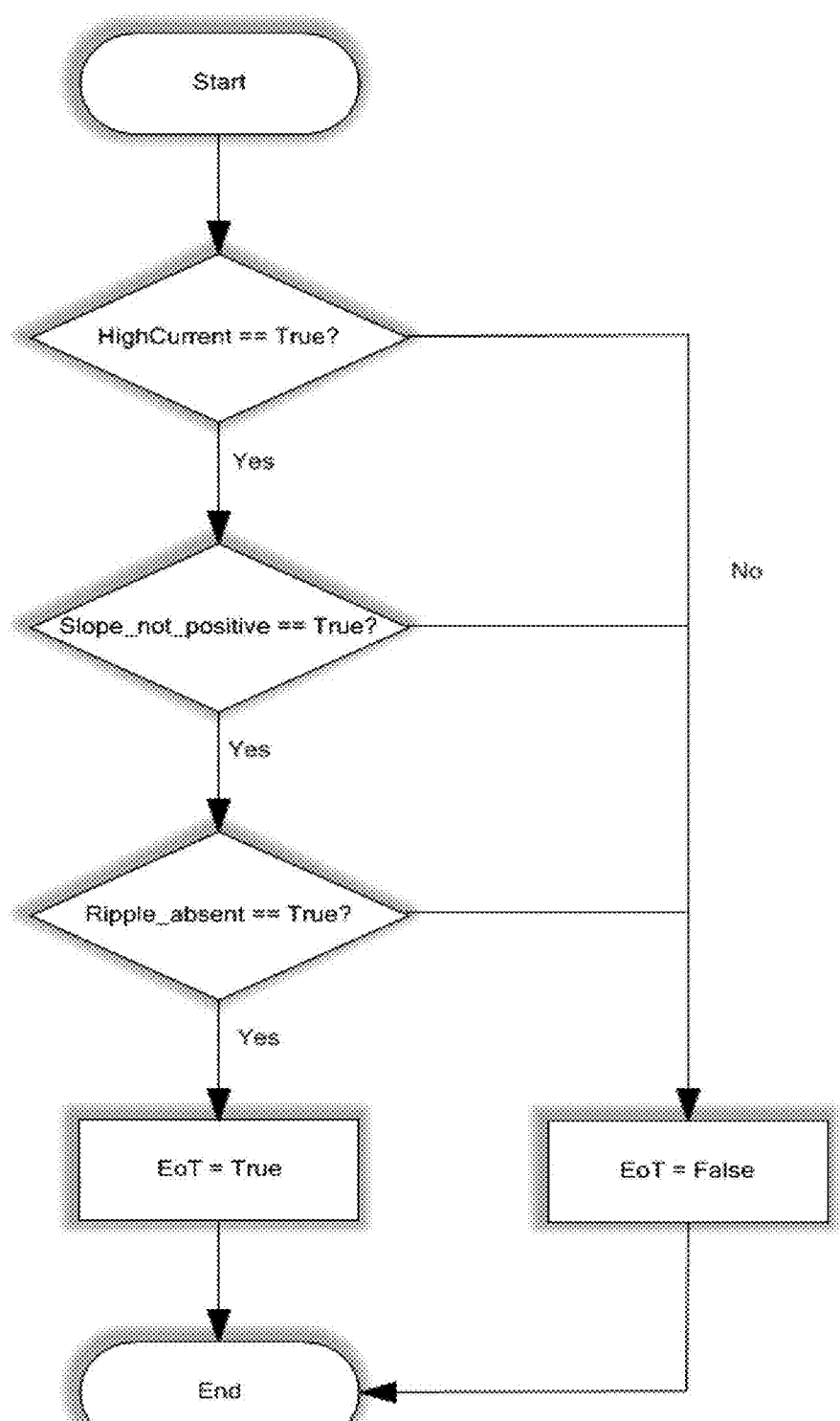
FIG. 5 shows a flow chart of the operations performed by one of the modules of the power window control software of FIG. 4.

In particular, as shown in the flow chart of FIG. 5, the End-of-Travel Decider 8 is designed to provide information, conveniently of Boolean type, indicating the need to stop the power window when all the following conditions are simultaneously met: the amplitude of the electric current absorbed by the power window satisfies a predetermined relation with the high current threshold, conveniently is higher than the high current threshold, the gradient of the amplitude of the electric current absorbed by the power window satisfies a predetermined relation with the control threshold, conveniently is not higher than the control threshold, and the ripple period of the amplitude of the electric current absorbed by the power window satisfies a predetermined relation with a ripple period threshold, conveniently is lower than the ripple period threshold.

Based on the information provided by the End-of-Travel Decider 8, the electronic control unit 1 then generates a corresponding electric power window stop command.

Figure 6:
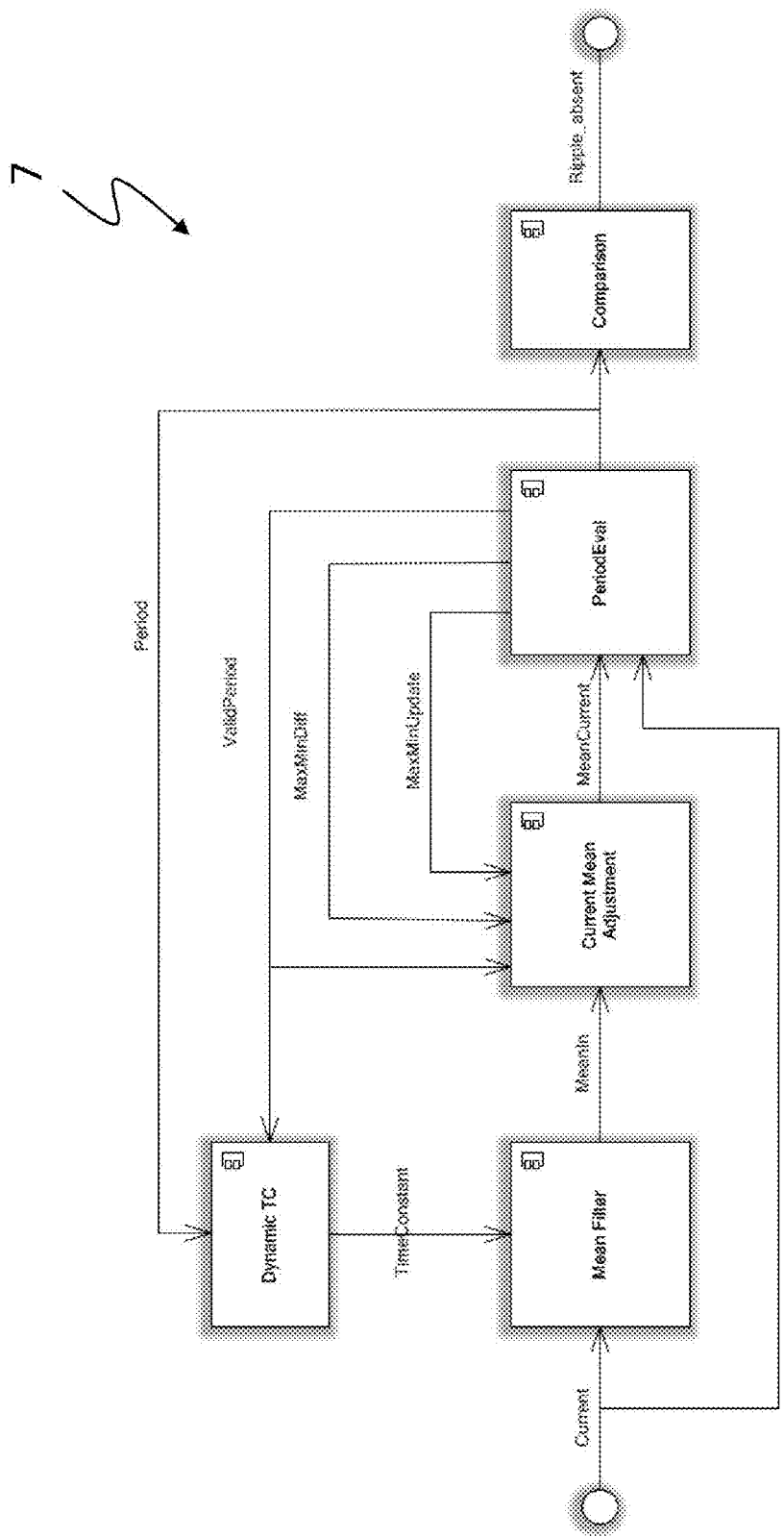
FIG. 6 shows a block diagram of the operations performed by one of the modules of the power window control software of FIG. 4.

With regard to the estimate of the ripple period of the amplitude of the electric current absorbed by the power window, the Ripple Period Estimator 7, an exemplary non-limitative functional block diagram of which is shown in FIG. 6, is designed to identify the ripple rising and falling edges, to look for local peaks and lows, and then to calculate the ripple period as a time interval between two successive highs or lows.

Figure 7:
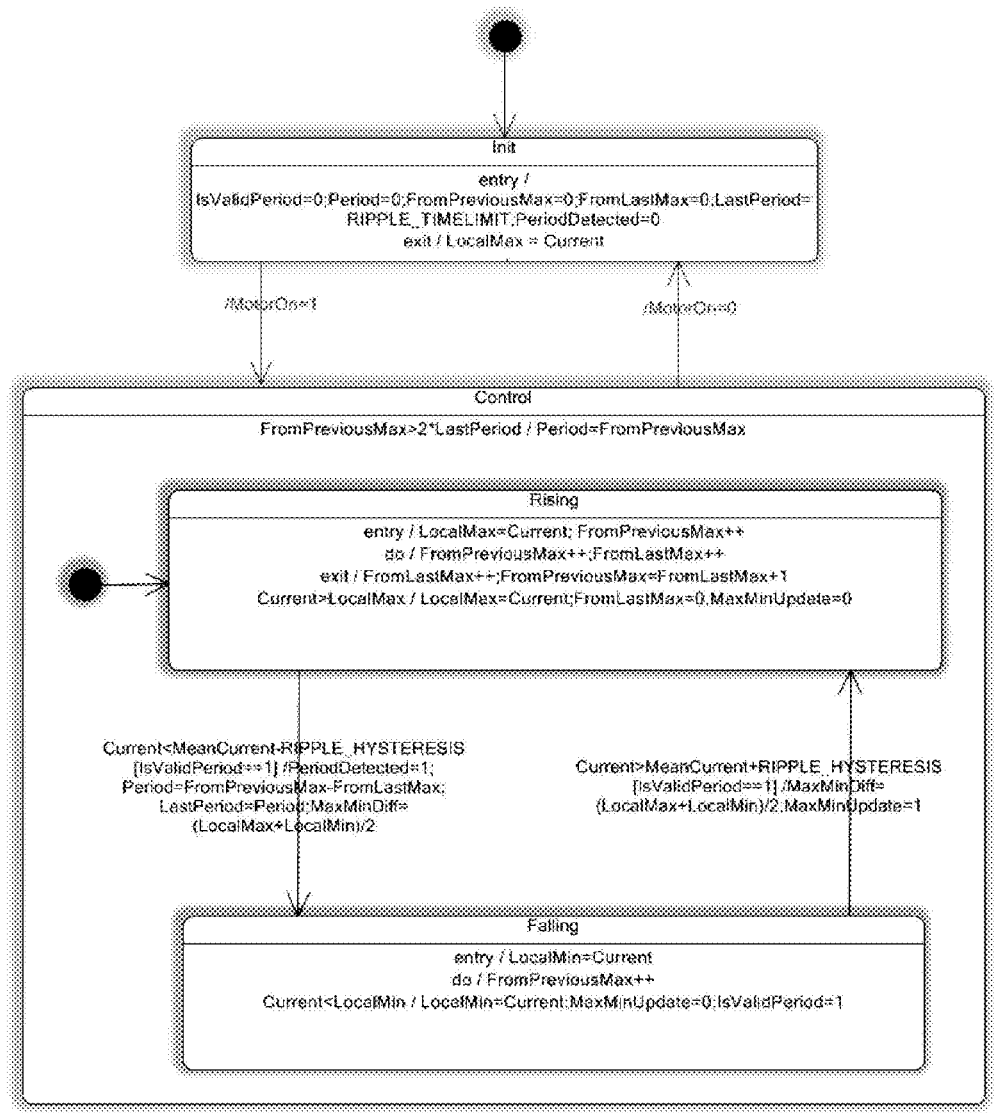
FIG. 7 shows a description in the Unified Modelling Language of a State Machine that describes the behaviour of one of the blocks in the block diagram of FIG. 6.

In particular, to distinguish rising and falling edges, the Ripple Period Estimator 7 conveniently implements a State Machine ("Period Eval" block in FIG. 6), an exemplary non-limitative description in the Unified Modeling Language (UML) of which is shown in FIG. 7.

In detail, the State Machine is designed to compare the data of the absorbed electric current with a mean value, which is conveniently obtained by means of a suitable first-order digital filter. In particular, the State Machine is conveniently designed to compute an upper threshold and a lower threshold with respect to the mean value thus rejecting the low frequency noise when the electric motor is stalled, to compare the data of the electric current absorbed by the power window with said upper and lower thresholds and to search a local high when the machine determines that the electric current absorbed by the power window exceeds the upper threshold, and a local low when the machine determines that the electric current absorbed by the power window falls below the lower threshold. Therefore, a full ripple is recognized at the next rising edge and the period is calculated according to the times corresponding to the current samples elapsed between two successive highs. This calculation is instantaneous and does not require an accumulation of stored data.

Figure 8:
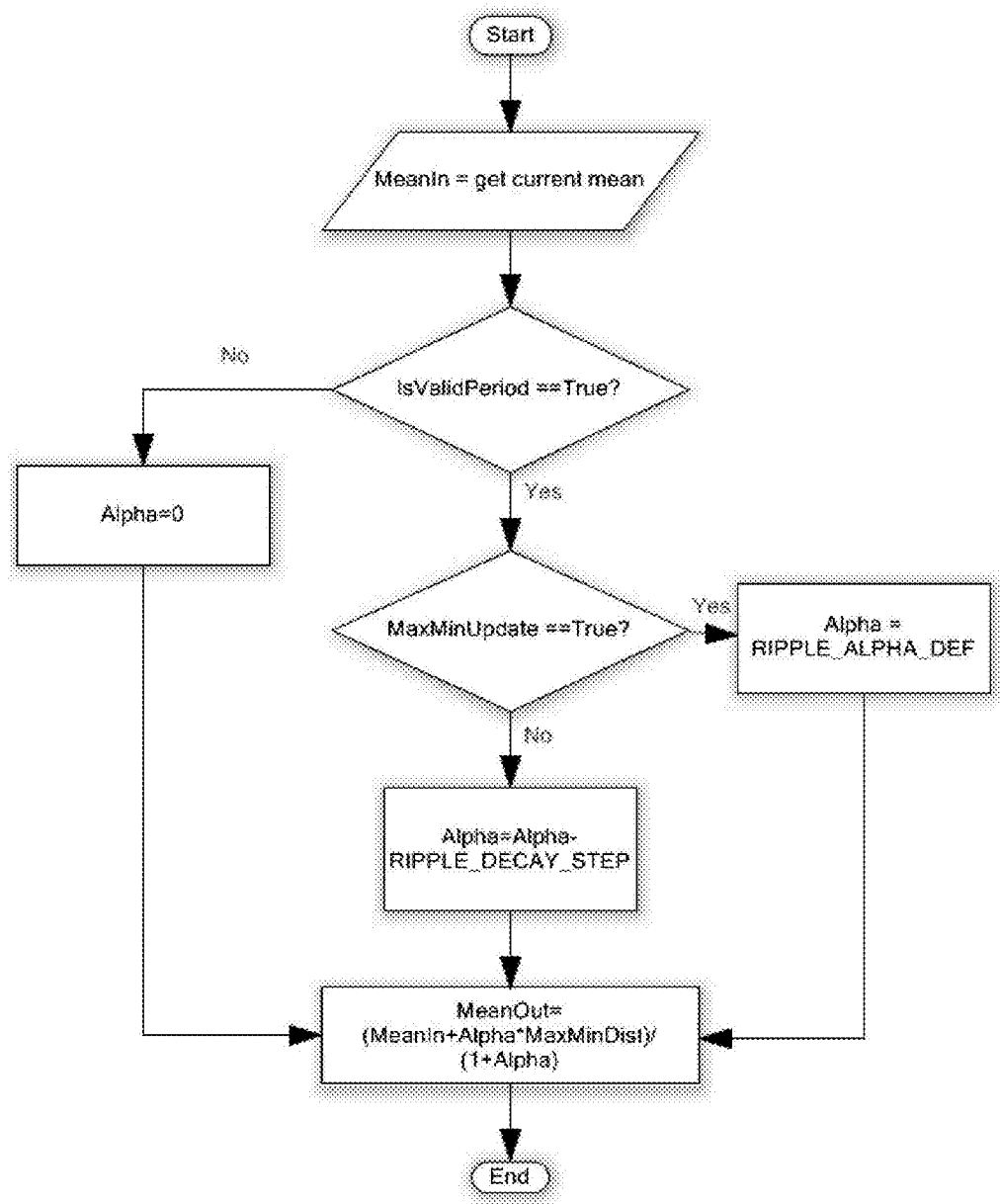
FIG. 8 shows a flow chart of the operations implemented by another of the blocks in the block diagram of FIG. 6.

In addition, conveniently but not necessarily computation of the mean value has two correction mechanisms shown in the exemplary non-limitative block diagram of FIG. 6: the first mechanism (implemented by the "Dynamic TC" block) is designed to make the mean value more stable or more responsive to variations of the amplitude of the absorbed electric current so as to speed up the detection of the ripple in the initial stage and to be immune to sudden changes later, while the second mechanism (implemented by the "Current Mean Adjustment" block), illustrated in detail in the exemplary non-limitative flowchart of FIG. 8, is designed to correct the value of an amount corresponding to half the amplitude of the ripple so as to bring it towards the geometric centre of the sinusoid, the current peaks being not symmetrical as a result of the mechanics of the power window and of the motor.

Based on what described above, the advantages of the invention if compared with the state of the art solutions are evident.

In particular, the invention detects a reached end-of-travel position in a very simple way and, consequently, has a low impact on the request for processing resources of the electronic control unit implementing it.

In particular, by obtaining different information from the electric current absorbed by the power window, namely the amplitude of the absorbed electric current, its gradient and the ripple frequency of the amplitude of the absorbed electric current, and by suitably correlating them, the invention allows to determine with certainty the stall condition of the power window in the whole temperature range specified for the component.

Finally, the invention solves the aforesaid problems without introducing mechanical changes or other variations in the automotive design. The power windows are thus controlled by using simple and cost-effective mechanical and electrical components.

Various modifications to the described embodiments may be made without thereby departing from the scope of protection of the claimed invention.

In particular, the previously described technicalities of the invention, and specifically: —the specific relations that are to be satisfied by the amplitude of the electric current absorbed by the power window, and by the gradient and by the ripple frequency thereof, the specific way in which the ripple frequency of the electric current absorbed by the power window is computed, the specific way in which the rising and falling edges of the ripple of the electric current absorbed by the power window are identified, the specific way in which the means value is computed, with which the data of the electric current absorbed by the power window is compared, and in particular the definition and the computation of a higher threshold and a lower threshold than the mean value, and the definition and the technicalities of two correction mechanisms in the computation of the mean value, are provided with the sole purpose of providing a non-limitative example of a possible reduction to practice of the invention and may hence be different than those described.

In fact, the previously described specific technicalities of the invention depend on many factors, and mainly on the design choices of the motor vehicle manufacturer on the basis of, among other things, a trade-off between the costs for the reduction to practice of the invention and the performance which is desired to be achieved, and for this reason the previously described technicalities of the invention are not to be construed as essential features of the invention.

The invention claimed is:

1. An automotive electronic control unit comprising:
   an analog-to-digital converted (ADC) data collector module configured to receive an analog electric signal indicative of an amplitude of an electric current absorbed by an automotive electrically-actuated device; and
   an end-of-travel detector module configured to:
      receive data indicative of the amplitude of the absorbed electric current from the ADC data collector module;
      determine a gradient of the amplitude of the absorbed electric current;
      determine a ripple frequency of the amplitude of the absorbed electric current; and
      determine, based at least in part on the data indicative of the amplitude of the absorbed electric current, the gradient, and the ripple frequency, that the automotive electrically-actuated device has reached an end-of-travel position or stall position.

2. The automotive electronic control unit of claim 1, further comprising a peak detector module configured to determine a peak amplitude of a start-up electric current absorbed by the automotive electrically-actuated device.

3. The automotive electronic control unit of claim 2, wherein the end-of-travel detector module is further configured to receive data indicative of the peak amplitude of the start-up electric current from the peak detector module.

4. The automotive electronic control unit of claim 3, wherein the end-of-travel detector module is further configured to:
   determine the amplitude of the absorbed electric current absorbed is higher than a current threshold;
   determine the gradient is less than or equal to a control threshold; and
   determine the ripple frequency is lower than a frequency threshold.

5. The automotive electronic control unit of claim 4, wherein the current threshold is a function of the peak amplitude of the start-up electric current.

6. The automotive electronic control unit of claim 4, wherein the current threshold is equal to a predetermined percentage of the peak amplitude.

7. The automotive electronic control unit of claim 1, wherein the automotive electrically-actuated device comprises at least one of an automotive power window, an automotive power mirror, an automotive power seat, or an automotive power sunroof.

8. A method of controlling an automotive electrically-actuated device, comprising:
   receiving, at an automotive electronic control unit, an analog electric signal indicative of an amplitude of an electric current absorbed by an automotive electrically-actuated device;
   receiving, at the automotive electronic control unit, data indicative of the amplitude of the absorbed electric current;
   determining, by the automotive electronic control unit, a gradient of the amplitude of the absorbed electric current;
   determining, by the automotive electronic control unit, a ripple frequency of the amplitude of the absorbed electric current; and
   determining, by the automotive electronic control unit, based at least in part on the data indicative of the amplitude of the absorbed electric current, the gradient, and the ripple frequency, that the automotive electrically-actuated device has reached an end-of-travel position or stall position.

9. The method of claim 8, further comprising determining, by the automotive electronic control unit, a peak amplitude of a start-up electric current absorbed by the automotive electrically-actuated device.

10. The method of claim 9, further comprising receiving data indicative of the peak amplitude of the start-up electric current.

11. The method of claim 10, further comprising:
    determining the amplitude of the absorbed electric current absorbed is higher than a current threshold;
    determining the gradient is less than or equal to a control threshold; and
    determining the ripple frequency is lower than a frequency threshold.

12. The method of claim 11, wherein the current threshold is a function of the peak amplitude of the start-up electric current.

13. The method of claim 11, wherein the current threshold is equal to a predetermined percentage of the peak amplitude.

14. The method of claim 8, wherein the automotive electrically-actuated device comprises at least one of an automotive power window, an automotive power mirror, an automotive power seat, or an automotive power sunroof.

15. A non-transitory computer-readable medium containing computer-executable instructions which, when executed by an automotive electronic control unit, are operable to perform a method controlling an automotive electrically-actuated device, comprising:
    receiving an analog electric signal indicative of an amplitude of an electric current absorbed by an automotive electrically-actuated device;
    receiving data indicative of the amplitude absorbed electric current;
    determining a gradient of the amplitude of the absorbed electric current;
    determining a ripple frequency of the amplitude of the absorbed electric current; and
    determining, based at least in part on the data indicative of the amplitude of the absorbed electric current, the gradient, and the ripple frequency, that the automotive electrically-actuated device has reached an end-of-travel position or stall position.

16. The non-transitory computer-readable medium of claim 15, further comprising determining a peak amplitude of a start-up electric current absorbed by the automotive electrically-actuated device.

17. The non-transitory computer-readable medium of claim 16, further comprising receiving data indicative of the peak amplitude of the start-up electric current.

18. The non-transitory computer-readable medium of claim 17, further comprising:

determining the amplitude of the absorbed electric current absorbed is higher than a current threshold;

determining the gradient is less than or equal to a control threshold; and determining the ripple frequency is lower than a frequency threshold.

19. The non-transitory computer-readable medium of claim 18, wherein the current threshold is a function of the peak amplitude of the start-up electric current.

20. The non-transitory computer-readable medium of claim 18, wherein the current threshold is equal to a predetermined percentage of the peak amplitude.

* * * * *